(12) United States Patent
Vandermeijden

(10) Patent No.: US 10,254,873 B2
(45) Date of Patent: Apr. 9, 2019

(54) SYSTEM AND METHOD FOR DETERMINING USER INPUT USING DUAL BASELINE MODES

(75) Inventor: Tom Vandermeijden, Los Gatos, CA (US)

(73) Assignee: Synaptics Incorporated, San Jose, CA (US)

( * ) Notice: Subject to any disclaimer, the term of this patent is extended or adjusted under 35 U.S.C. 154(b) by 952 days.

(21) Appl. No.: 13/101,915

(22) Filed: May 5, 2011

(65) Prior Publication Data

US 2012/0283972 A1    Nov. 8, 2012

(51) Int. Cl.
*G06F 3/041* (2006.01)

(52) U.S. Cl.
CPC .................. *G06F 3/0416* (2013.01)

(58) Field of Classification Search
CPC ..................................................... G06F 3/0416
USPC .................. 702/65, 179, 104, 182, 189, 190
See application file for complete search history.

(56) References Cited

U.S. PATENT DOCUMENTS

| | | |
|---|---|---|
| 4,733,222 A | 3/1988 | Evans |
| 5,889,236 A | 3/1999 | Gillespie et al. |
| 5,924,708 A | 7/1999 | Bisaillon et al. |
| 7,643,010 B2 | 1/2010 | Westerman et al. |
| 7,920,134 B2 | 4/2011 | Krah |
| 2007/0296709 A1 | 12/2007 | GuangHai |
| 2008/0158182 A1 | 7/2008 | Westerman |
| 2009/0019949 A1 | 1/2009 | Rothkopf et al. |
| 2009/0225036 A1 | 9/2009 | Wright |

*Primary Examiner* — Janet L Suglo
(74) *Attorney, Agent, or Firm* — Ferguson Braswell Fraser Kubasta PC

(57) ABSTRACT

The embodiments described herein provide devices and methods that facilitate improved performance. In one embodiment, an input device comprises a plurality of capacitive sensor electrodes and a processing system coupled to the electrodes and configured to operate the electrodes to sense in a sensing region. Specifically, the processing system is configured to determine information about input objects in the sensing region based on comparisons of preliminary values with corresponding baseline values. The processing system is further configured to selectively operate in a first mode and a second mode. While operating in the first mode, the processing system selectively changes a baseline value of the plurality of baseline values by a first amount in response to that baseline value being below a corresponding preliminary value. This selective changing of baseline values occurs even when the processing system determines that an input object is in the sensing region.

20 Claims, 8 Drawing Sheets

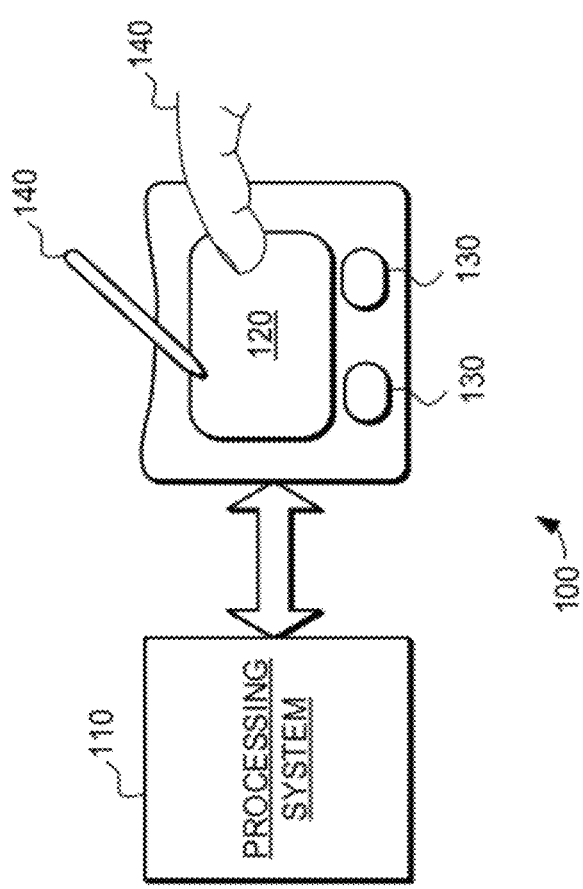

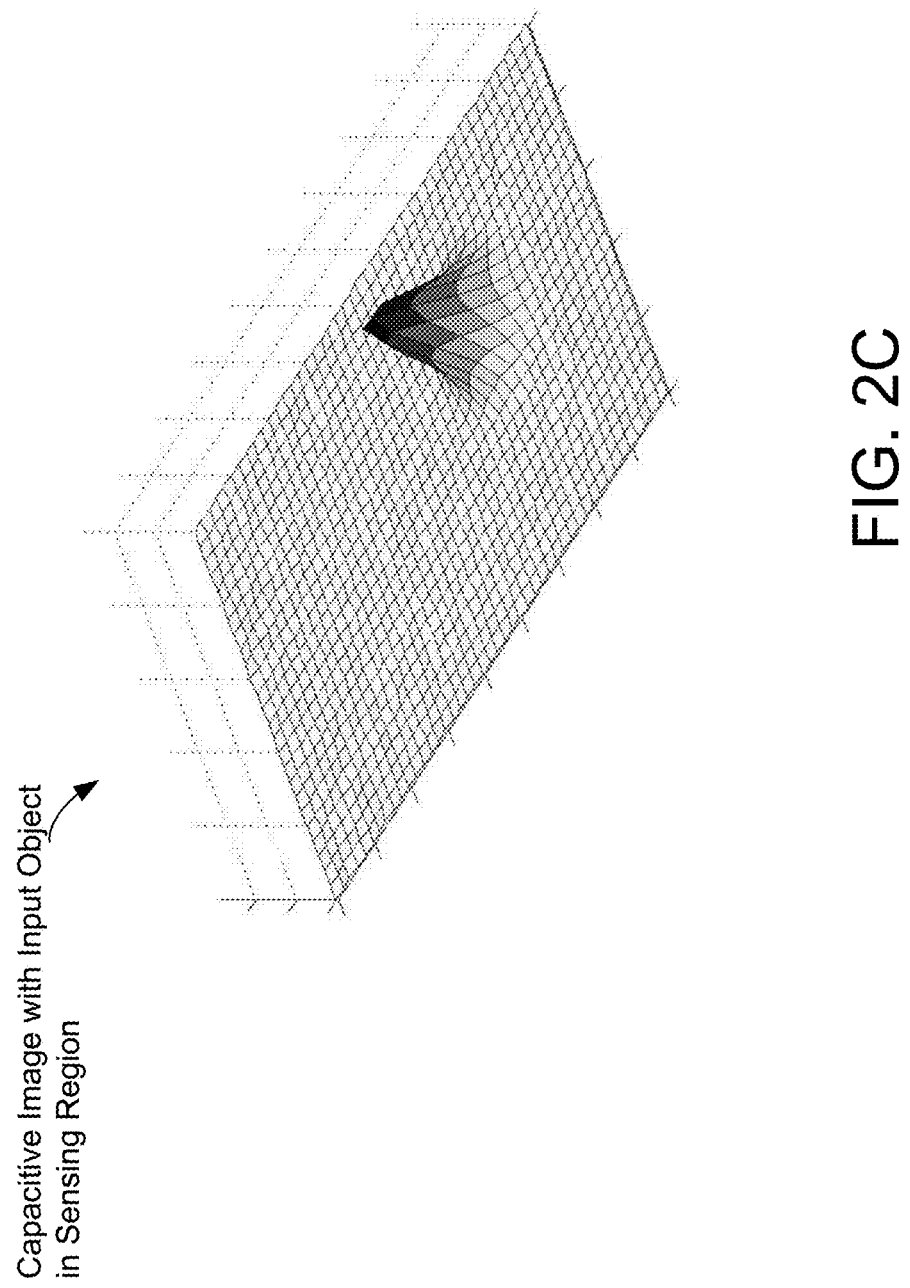

SYSTEM AND METHOD FOR DETERMINING USER INPUT USING DUAL BASELINE MODES

FIELD OF THE INVENTION

This invention generally relates to electronic devices.

BACKGROUND OF THE INVENTION

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

While input devices have found many applications, engineers continue to seek design alternatives that reduce costs and/or improve sensor performance. For example, improvements in efficiently and reliably detecting and locating the presence of input objects in the sensing region.

Specifically, in some input devices situations may arise that can cause one or more objects to be "hallucinated". That is, the input device may detect and identify the presence of an object in a sensing region where no such object actually exists. Such a hallucination of an object can cause proximity sensor device to generate unwanted input, or incorrectly respond to real input by the user. As such, such a hallucination can seriously impair the usability of the input device and/or the associated electronic system.

Such a hallucination of objects can occur for a variety of reasons. One potential reason is that the input device relied upon deficient baseline values in determining the presence of the object. Specifically, typical input devices compare baseline values to measured values to determine the presence objects. If the baseline values used to determine object presence are incorrect, the device may detect an object where no such object actually exists.

Thus, there remains a continuing need for improvements in the techniques used to detect and identify objects in proximity sensor devices. Other desirable features and characteristics will become apparent from the subsequent detailed description and the appended claims, taken in conjunction with the accompanying drawings and the foregoing technical field and background.

BRIEF SUMMARY OF THE INVENTION

The embodiments of the present invention provide devices and methods that facilitate improved input devices. Specifically, the devices and methods provide the ability to reliably determine information about input in a sensing region, and thus facilitate improved input device performance.

In one embodiment, an input device comprises a plurality of capacitive sensor electrodes and a processing system coupled to the electrodes and configured to operate the electrodes to sense in a sensing region. Specifically, the processing system is configured to determine information about input objects in the sensing region based on comparisons of preliminary values with corresponding baseline values. The processing system is further configured to selectively operate in a first mode and a second mode. While operating in the first mode, the processing system selectively changes a baseline value of the plurality of baseline values by a first amount in response to that baseline value being different from a corresponding preliminary value. This selective changing of baseline values occurs even when the processing system determines that an input object is in the sensing region.

In contrast, while operating in the second mode, the processing system does not selectively change baseline values by the first amount in response to that baseline value being different from the corresponding preliminary value when the processing system determines that an input object is in the sensing region.

In various embodiments, the selective changing of baseline values in the first mode serves to reduce over time measurement values that correspond to input objects in the sensing region. This reduction over time gradually reduces away the effects of detected objects, including the effects of hallucinated objects that do not actually exist in the sensing region. Because such hallucinated objects could otherwise impair usability, the selective changing of baseline values may facilitate improved device performance. In contrast, in the second mode baseline values are not changed when input objects are in the sensing region, providing normal operation.

BRIEF DESCRIPTION OF DRAWINGS

The preferred exemplary embodiment of the present invention will hereinafter be described in conjunction with the appended drawings, where like designations denote like elements, and:

FIG. 1 is a block diagram of an exemplary system that includes an input device in accordance with an embodiment of the invention;

FIGS. 2A, 2B and 2C are top views of exemplary capacitive sensor electrodes and resulting capacitive images in accordance with an embodiment of the invention;

DETAILED DESCRIPTION OF THE INVENTION

Figure 2A:
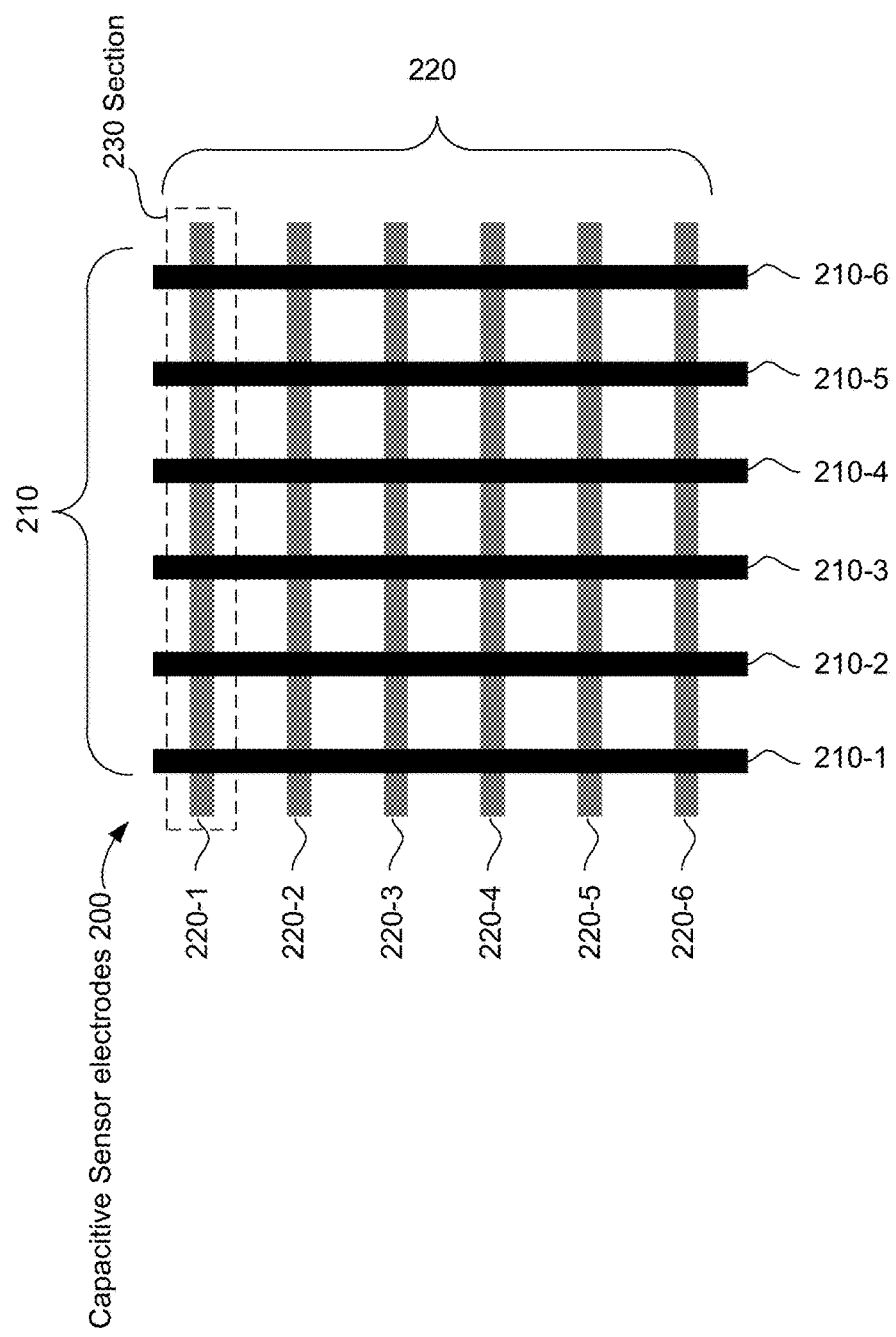

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that facilitate improved noise determination.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to capacitively sense input provided by one or more input objects 140 in a sensing region 120. Example input objects include fingers and styli, as shown in FIG. 1.

Sensing region 120 encompasses any space above, around, in and/or near the input device 100 in which the input device 100 is able to capacitively detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

Some implementations are configured to provide images that span one, two, three, or higher dimensional spaces. Some implementations are configured to provide projections of input along particular axes or planes.

In a suitable capacitive implementations of the input device 100, voltage or current is applied to create an electric field. Nearby input objects cause changes in the electric field, and produce detectable changes in capacitive coupling that may be detected as changes in voltage, current, or the like.

Some such capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. In some embodiments, the processing system 110 also comprises electronically-readable instructions, such as firmware code, software code, and/or the like.

In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes. As specific examples, the processing system 110 may comprise sensor electrode circuitry configured to operate a plurality of capacitive sensor electrodes to produce pluralities of preliminary values. The processing system 110 may also comprise a determination module configured to determine information about input in the sensing region 120 based on comparisons of the pluralities of preliminary values with corresponding baseline values of a plurality of baseline values. In determining information about input the determination module may perform a variety tasks, including determinations of values, comparisons of values and the selective modifications of values. Additionally, the determination module may selectively operate in and switch between one or more modes. These and other operations are described in detail below with reference to the operation of the processing system 110. Thus, while the details of these and other operations are described with reference to the processing system 110 in general, the entirety of or a portion of such operations may be performed by the determination module or any other suitable module and/or circuitry that is part of the processing system 110.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

In general, the various embodiments provide devices and methods that facilitate improved input devices. Specifically, the devices and methods provide the ability to reliably determine information about input in a sensing region, and thus facilitate improved input device performance.

In one embodiment, an input device 100 comprises a processing system 110 and plurality of capacitive sensor electrodes. The processing system 110 is coupled to the capacitive sensor electrodes and configured to operate the electrodes to sense in the sensing region 120. In general the processing system 110 is configured to determine information about input objects in the sensing region 120 based on comparisons of preliminary values with corresponding baseline values. As described above, this information about input objects in the sensing region 120 may be used to provide a variety of user interface actions.

During operation of the input device 100, the processing system 110 is configured to selectively operate in a first mode and a second mode. While operating in the first mode, the processing system 110 selectively changes a baseline value of the plurality of baseline values by a first amount in response to that baseline value being different from a corresponding preliminary value. This selective changing of baseline values occurs even when the processing system 110 determines that an input object is in the sensing region 120.

In one embodiment, selectively changing the baseline value of the plurality of baseline values by a first amount in response to that baseline value being different from a corresponding preliminary value comprises selectively increasing the baseline value of the plurality of baseline values by the first amount in response to the baseline value being below the corresponding preliminary value of the pluralities of preliminary values. In another embodiment, selectively changing the baseline value of the plurality of baseline values by a first amount in response to that baseline value being different from a corresponding preliminary value comprises selectively decreasing the baseline value of the plurality of baseline values by the first amount in response to the baseline value being above the corresponding preliminary value of the pluralities of preliminary values.

In contrast, while operating in the second mode, the processing system 110 does not selectively change baseline values by the first amount in response to that baseline value being different from the corresponding preliminary value when the processing system 110 determines that an input object is in the sensing region 120.

Typically, the selective changing of baseline values of the plurality of baseline values by a first amount in response to that baseline value being different from a corresponding preliminary value is done in a way that reduces corresponding measured values. Specifically, in a typical system measured values are determined to reflect the difference between a corresponding preliminary value and a corresponding baseline value. In such a system the selective changing of the baseline values would be done to decrease the measured value in a way that would cause a sensed object (either real or hallucinated) to be reduced away over time. In some cases, this would be accomplished by increasing the baseline values in response to the preliminary value being above the corresponding baseline value. In other embodiments, this would be accomplished by decreasing the baseline values in response to the preliminary value being below the corresponding baseline value. In either case, the result is to decrease the magnitude of the corresponding measured value and thus reduces the effect of any sensed objects over time.

In other embodiments the same effect may be accomplished by selectively decreasing measured values directly in response to a corresponding baseline value being different from a corresponding preliminary value of the pluralities of preliminary values even when the processing system determines that an input object is in the sensing region. Such an approach effectively reduces the effects of sensed objects directly, without changing the underlying baseline values. In one embodiment, a corresponding baseline value being different from a corresponding preliminary value comprises corresponding baseline value less in magnitude compared to a corresponding preliminary value.

This configuration of the processing system 110 to selectively change baseline values in the first mode serves to reduce the effects of input objects in the sensing region 120. Specifically, selectively changing the baseline values over time reduces the measurement values that correspond to input objects in the sensing region 120. This reduction over time gradually reduces the effects of detected input objects in the sensing region 120. This reduction is of both the effects of real input objects in the sensing region, and the effects of "hallucinated objects" detected in the sensing region 120. In this application, the term real input objects may refer to actual input objects that are in the sensing region, such as input object 140 and, the term "hallucinated object" refers to an incorrect determination of an input object being in the sensing region.

Because the hallucinated objects could otherwise impair usability, the selective changing of baseline values may facilitate improved device performance. In contrast, in the second mode baseline values are not changed when input objects are in the sensing region 120.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Turning now to FIG. 2A, one example of a plurality of capacitive sensor electrodes 200 is illustrated. FIG. 2A shows a portion of an example sensor electrode pattern configured to sense in a sensing region associated with the pattern, according to some embodiments. For clarity of illustration and description, FIG. 2A shows a pattern of simple rectangles, and does not show various components. In one embodiment sensor electrodes 210 are configured as receiver electrodes and sensor electrodes 220 are configured as transmitter electrodes. In other embodiments, sensor electrodes 210 are configured to sense object position and/or motion the X direction and sensor electrodes 220 are configured to sense object position and/or motion in the Y direction.

Sensor electrodes 210 and 220 are typically ohmically isolated from each other. That is, one or more insulators separate sensor electrodes 210 and 220 and prevent them from electrically shorting to each other. In some embodiments, sensor electrodes 210 and 220 are separated by insulative material disposed between them at cross-over areas; in such constructions, the sensor electrodes 210 and/or sensor electrodes 220 may be formed with jumpers connecting different portions of the same electrode. In some embodiments, sensor electrodes 210 and 220 are separated by one or more layers of insulative material. In some other embodiments, sensor electrodes 210 and 220 are separated by one or more substrates; for example, they may be disposed on opposite sides of the same substrate, or on different substrates that are laminated together.

In various embodiments, the areas of localized capacitive coupling between transmitter electrodes and receiver electrodes may be termed "capacitive pixels." The capacitive coupling between the transmitter electrodes and receiver electrodes change with the proximity and motion of input objects in the sensing region associated with the transmitter electrodes and receiver electrodes.

In some embodiments, the sensor pattern is "scanned" to determine these capacitive couplings. That is, the transmitter electrodes are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The receiver sensor electrodes may be operated singly or multiply to acquire resulting signals. The resulting signals may be used to determine measurements of the capacitive couplings at the capacitive pixels.

Figure 2B:
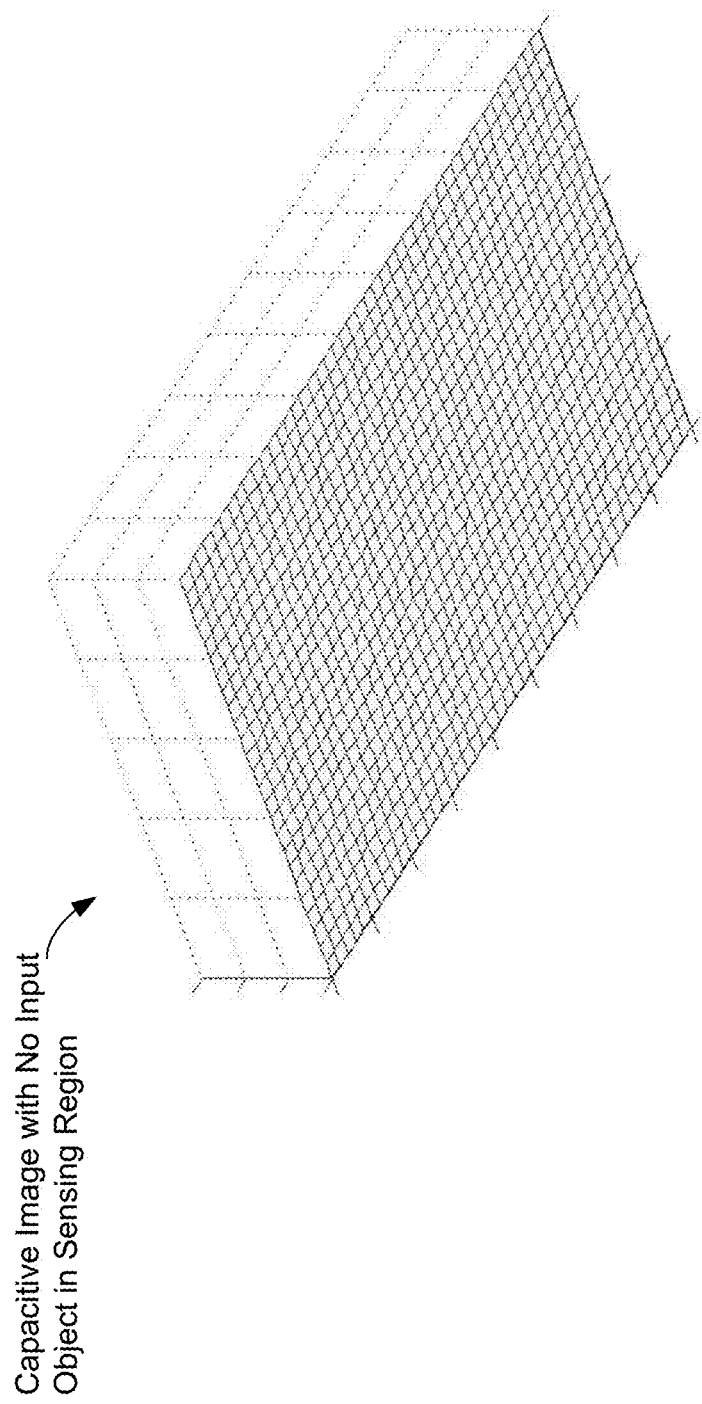

A set of measured values from the capacitive pixels forms a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region. FIG. 2B illustrates a capacitive image with no input object in sensing region 120 and FIG. 2C illustrates a capacitive image with an input object in sensing region 120.

A variety of different technologies may be used in implementing the input device 100 and these various implementations may generate resulting signals indicative of object presence in a variety of formats. In one embodiment, the input device may receive resulting signals from the receiver electrodes and generate preliminary values that correspond to the measured capacitance associated with each capacitive pixel. In another embodiment, the input device may receive resulting signals from the sensor electrodes and generate preliminary values that correspond to the measured capacitance associated with each electrode. In various embodiments, the measured capacitance may comprise effects corresponding to input objects in the sensing region, background capacitance, external interference, internal interference and other sources. The preliminary values may be based upon measures of absolute capacitance, transcapacitance, or some combination thereof. Furthermore, the resulting signals may be sampled, amplified, filtered, or otherwise conditioned as desirable to generate the preliminary values. For example, in one embodiment an input object in the sensing region may decrease the measured capacitive coupling; however, the corresponding preliminary value may be represented as being positive, a negative of the measured capacitance. As such, while the measured capacitance may decrease the corresponding preliminary value is positive. In other embodiments, preliminary values corresponding to a decrease in the measured capacitive coupling may be represented as being negative.

In a typical embodiment the preliminary values are then compared to corresponding baseline values. For example, the difference between each preliminary value and its corresponding baseline value may be determined, and that difference then used as a measured value for determining input in the sensing region. In one embodiment, the baseline values conceptually serve as a reference point for measuring changes that occur over time. Further, the measured values may be considered to be delta values, i.e., the change in the preliminary values compared to baseline values. In one embodiment, at least one of the measured values and the duration of the input object in the sensing region are used to determine that an input object is in the sensing region. It should be noted that in a typical embodiment, there is a one to one correspondence between the preliminary values and their corresponding baseline values. Thus, every preliminary value is compared to its own corresponding baseline value to determine a measured value. In other embodiments, a baseline value may correspond to more than one preliminary value. The number of preliminary values generated and baseline values compared to may depend on the number of electrodes used and the sensing technology. In some embodiments the baseline values are comprised in a "baseline image" or "baseline mages".

Figure 3:
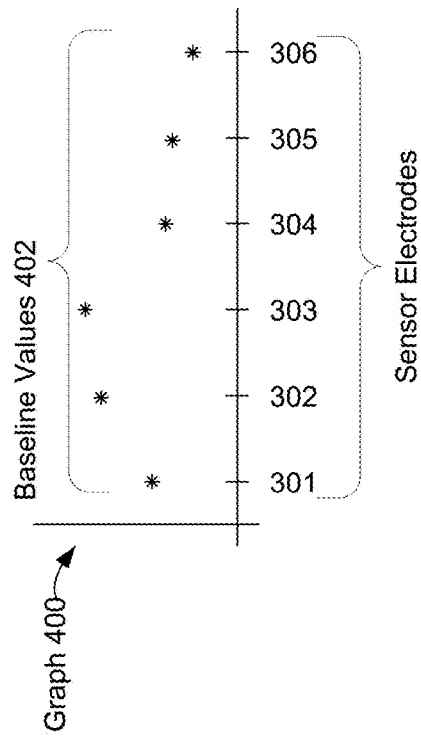
FIGS. 3-5 are graphical views of exemplary preliminary values, baseline values and measured values in accordance with an embodiment of the invention.
Figure 4:
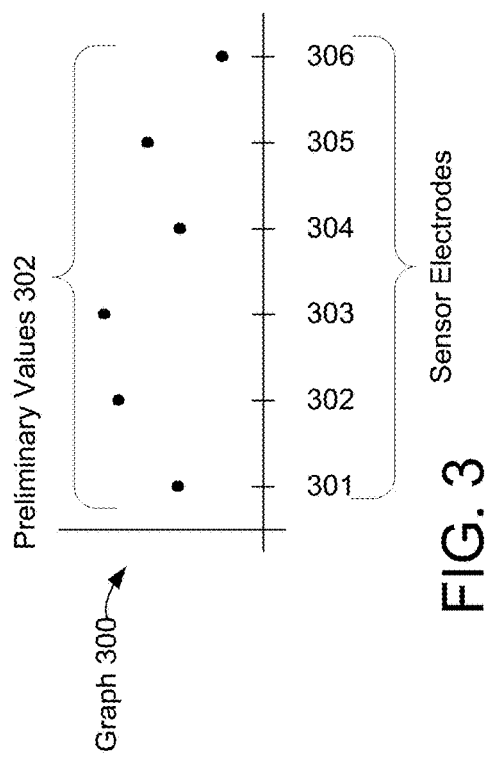
Figure 5:
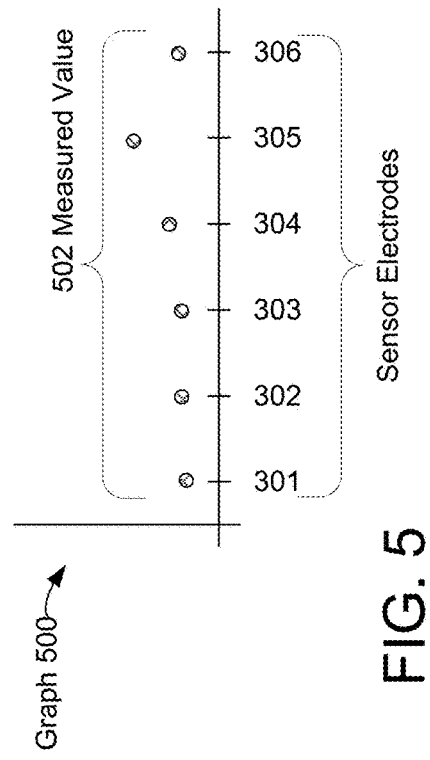

Turning now to FIGS. 3-5, graphs 300, 400, and 500, illustrate exemplary preliminary values, baseline values, and measured values for an example input device. In this figure, graph 300 illustrates preliminary values 302 in response to an input object being in sensing region 120. For ease of description, each preliminary value 302 is represented as a dot plotted against a corresponding sensor electrode 301-306. In various embodiments, the preliminary values may be represented as a two-dimensional capacitive image or a stream of data. In one embodiment, sensor electrodes 301-306 correspond to the sensor electrodes of section 230 (sensor electrodes 210-1-210-6) of FIG. 2. For example, each preliminary value may correspond to a capacitive coupling between sensor electrode 220-1 and a sensor electrode of sensor electrodes 210-1-210-6. In one specific example, preliminary value 301 corresponds to the capacitive coupling between sensor electrodes 220-1 and 210-1, preliminary value 302 corresponds to the capacitive coupling between sensor electrodes 220-1 and 210-2, preliminary value 303 corresponds to the capacitive coupling between sensor electrodes 220-1 and 210-3, preliminary value 304 corresponds to the capacitive coupling between sensor electrodes 220-1 and 210-4, preliminary value 305 corresponds to the capacitive coupling between sensor electrodes 220-1 and 210-5, and preliminary value 306 corresponds to the capacitive coupling between sensor electrodes 220-1 and 210-6. In such an embodiment, preliminary values 302 correspond to a different "capacitive pixel" of a capacitive image. In this example, preliminary values 302 are representative of an input object in sensing region 120 and near sensor electrodes 210-3, 210-4 and 210-5.

Likewise, graph 400 illustrates corresponding baseline values 402. In this figure, each baseline value 402 is represented as a star, plotted against a corresponding sensor electrode 301-306. In one embodiment, sensor electrodes 301-306 correspond to the sensor electrodes of section 230 (sensor electrodes 210-1-210-6) of FIG. 2. As will be described in greater detail below, a variety of different techniques may be used to generate such baseline values. Furthermore, such baseline values may be selectively updated according to various criteria. In accordance with the embodiments described herein, this updating may include selective changes in baseline values in response to those baseline values being different from corresponding preliminary values.

Finally, graph 500 illustrates corresponding measured values 502. In these figures, each measured value 502 is represented as a hashed circle, plotted against the position a corresponding sensor electrode 301-306. In one embodiment, sensor electrodes 301-306 correspond to the sensor electrodes of section 230 (sensor electrodes 210-1-210-6) of FIG. 2. As described above, the measured values 502 are typically generated with a comparison of each preliminary value with its corresponding baseline value. Thus, the measured values 502 may typically be considered to be delta values. Finally, the magnitude of the measured values 502 are indicative of the location of an input object in the sensing region and thus may be used to determine positional information for the input object. In one embodiment, the measured values may be represented as a capacitive image as shown in FIG. 2C. FIGS. 3-5 illustrate the preliminary value as being above or substantially equal to corresponding baseline values. However, in embodiments where preliminary values corresponding to a change is capacitance are represented as negative values, the preliminary values may be below corresponding baseline values and corresponding measured values may be negative.

Thus, the baseline values serve as the basis for determining the measured values and the location of input in the sensing region. For this reason, it is generally desirable to determine the baseline values from resulting signals taken during times when no objects are in the sensing region. Thus, in a typical input device resulting signals (and preliminary values) are being continuously generated by the input device. Some of these resulting signals will be generated when no objects are believed to be within the sensing region. In most systems it is those resulting signals that are commonly used to generate the baseline values. Thus, the baseline values will reflect the underlying capacitance (e.g., background capacitance), including the effects of interference and other factors that can affect the resulting signals. When so generated the baseline values provide an effective basis for determining changes in capacitance that occur in response to the presence of objects.

While FIGS. 3-5 are described as related to changes in capacitive coupling between sensor electrode 220-1 and sensor electrodes 210-1-210-6, in other embodiments, FIGS. 3-5 may be further described as related to changes in capacitive coupling between sensor electrodes 210-1-210-6 and an input object. In such embodiments, FIGS. 3-5 represent a single axis of the sensing device (e.g., X axis); however, similar methods and techniques may be used determine the second axis (e.g., Y axis). For example, the Y axis may be related to sensor electrodes 220-1-220-6 of sensor 200.

In various embodiments, the baseline values may correspond to the background capacitance of a sensor device. The background capacitance changes with the environment and operating conditions, and may be estimated in various ways. The baseline values may be changed corresponding to the background capacitance of the sensor device. In most cases, the background capacitance of the sensor device will be determined when no input objects are in the sensing region. However, this is not always possible and may lead to the miscalculation of the baseline values.

The baseline values may be determined by measuring the capacitive coupling between each transmitter electrode and each receiver electrode. In another embodiment, the baseline values may be determined by measuring the capacitance between a subset of the transmitter electrodes and/or a subset of the receiver electrodes. In yet further embodiments, the baseline values may be determined by measuring the capacitance of each sensor electrode. Because objects in the sensing region affect this measured capacitance, good baseline values may refer to baseline values that are determined with no input objects in the sensing region.

In one embodiment, if an input object is determined to be in the sensing region as the baseline values are being determined, the determination of the baseline values may be cancelled or paused. In response to a determination that no input objects are in the sensing region, the baseline values may then be determined. However, in other embodiments it may not be possible to determine the baseline values when no input object is determined to be in sensing region. In such embodiments, the baseline values may lead to errors in determining position information for input objects in the sensing region. Such a condition may arise during startup of the device, as during these times known good baseline values may not exist and it may be difficult for the input device to reliably determine if input objects are in the sensing region. Without a reliable determination of the presence of input objects the likelihood of a miscalculation of the baseline values is greatly increased.

Furthermore, once a miscalculation of the baseline values occurs there is a significant probability of errors persisting. For example, in some cases the miscalculation of the baseline values will result in the input device erroneously determining that an input object is in the sensing region and/or the positional information for an input object in the sensing region. In one embodiment, once such a determination is made it may persist until new baseline values may be determined. In this application, the term "hallucinated object" refers to an incorrect determination of an input object being in the sensing region. As described above, a hallucinated object may result from miscalculated baseline values, but may also arise from other circumstances.

Once such a hallucinated object exists on the input device it can create a variety of problems. For example, such a hallucinated object can cause proximity sensor device to generate unwanted input, or incorrectly respond to real input by the user. As such, such a hallucination can seriously impair the usability of the input device and/or the associated electronic system. And because the presence of the hallucinated object may prevent the input device from recalculating the baseline, some problems may persist for a significant period of time.

In accordance with the embodiments described herein, the input device is configured to selectively operate in a first mode and a second mode. While operating in the first mode, the processing system selectively changes a baseline value of the plurality of baseline values by a first amount in response to that baseline value being different from a corresponding preliminary value. In one embodiment, a determination module of processing system 110 is configured to selectively change a baseline value of the plurality of baseline values by a first amount in response to that baseline value being different from a corresponding preliminary value. This selective changing of baseline values occurs even when the processing system determines that an input object is in the sensing region. In one embodiment, selective changing of baseline value occurs even when the determination module determines that an input object is in the sensing region. Because changing the baseline reduces the corresponding measured values it may serve to reduce the effects of input objects that are in the sensing region. In one embodiment, as the baseline values are changed over time, effects of input objects in the sensing region may be reduced over time. In other embodiments, effects of input objects in the sensing region may be completely reduced over time.

In one embodiment, selectively changing a baseline value by a first amount comprises selectively increasing the baseline value by the first amount in response to the baseline value being below a corresponding preliminary value. In another embodiment, selectively changing a baseline value by a first amount comprises selectively decreasing the baseline value by the first amount in response to the baseline value being above a corresponding preliminary value.

It is important to note that this reducing of the effects of detected objects occurs to both input objects that are actually in the sensing region and "hallucinated objects" that are not actually in the sensing region. Thus, as baseline values are changed in response to preliminary values being different from the baseline value, any effects due to hallucinated objects eventually will be reduced over time. Because the hallucinated objects would otherwise impair usability, the selective changing of baseline values may facilitate improved device performance. In one embodiment, a determination module of processing system 110 is configured to not selectively change a baseline value of the plurality of baseline values by a first amount in response to that baseline value being different from a corresponding preliminary value.

However, because effects due to input objects in the sensing region would also be reduced over time, it is generally not desirable to always change baseline values by a first amount in response to each baseline value being different from a corresponding preliminary value. For this reason, the embodiments described herein provide a second operating mode where the input device does not selectively change baseline values by the first amount in response to that baseline value being different from the corresponding preliminary value when the processing system determines that an input object is in the sensing region. In some embodiments this second mode may be considered to be the normal operating mode.

In this second operating mode the input device would typically limit changes to the baseline values to those situations where it has not been determined that objects are in the sensing region. For example, an input device may be configured to periodically generate new baseline values at a time when it can be determined that no objects are in the sensing region. Once so generated, the baseline values may then be used as a reference for repeated future calculations of the sensing values. It should be noted that such a calculation of the baseline values while in the second mode may occur at various times. For example, once per second or once per minute, or every time the device is powered on or awakened from a "sleep" mode. In a typical implementation, the input device may be configured to recognize when no objects are in the sensing region and then use those identified times to calculate the baseline values.

It should be noted that a variety of other adjustments may be made to the baseline values in the second mode. For example, the baseline values may be adjusted for drift. Drift may be caused by environmental changes and changes in operating conditions. In one embodiment, environmental changes may include, but are not limited to, changes in temperature and humidity. In one embodiment, processing system 110 is configured to determine the environmental changes and changes in operating conditions and adjust the corresponding baseline values. In another embodiment, the environmental changes and changes in operating conditions are determined external from processing system 110, and an indication is sent to the processing system 110 indicating at least one of when and by how much to adjust the corresponding baseline values. In one embodiment, the determination module of processing system 110 is configured to adjust a baseline value in response to drift over time caused by at least one of environmental adjust and changes in operating conditions.

In other embodiments, when no input object is determined to be in the sensing region, the baseline values may be "relaxed". In such an embodiment, baseline values that are different from or above corresponding preliminary values, are correspondingly changed or decreased over time, realigning the baseline values with the preliminary values. This occurs when no input objects are determined to be in the sensing region, so that effects due to input objects in the sensing region are not reduced overtime.

As was described above, in the first mode the processing system selectively changes a baseline value of the plurality of baseline values by a first amount in response to that baseline value being different from a corresponding preliminary value. This selective changing of baseline values occurs even when the processing system determines that an input object is in the sensing region. In one embodiment the processing system is configured to compare the preliminary values to the corresponding baseline value during each sensing cycle. Thus, each baseline value may be updated for each cycle of operation of the processing system. In other embodiments comparison may be performed at a rate of less than each cycle or more than one cycle, and thus the baseline values may not be updated at the same rate as the preliminary values are generated and used to determine input.

Furthermore, because the processing system is configured to change each baseline value by a first amount in response to the baseline value being different from a corresponding preliminary value, the "first amount" is the magnitude of the delta change in the baseline values that may occur in response to the comparison. In some embodiments, the first amount is a predetermined constant amount. In these embodiments the baseline value would be adjusted by the same amount each time it is determined to be different from the preliminary value. In other embodiments, the first amount may selected by the processing system based on selected criteria and thus may be periodically updated. In these embodiments the baseline values may be adjusted by different amounts depending on the status of these criteria. As one example, the processing system may be configured to select the first amount based at least in part on the number of objects that are currently determined to be in the sensing region. Other exemplary criteria may include the size of the input object(s), the positional information for the input object(s), usage models, skill level of the user and duration the input object is in the sensing region. In other embodiments, the criteria may include input device settings. In some embodiments, the first amount may be different for different sections of the sensing region. In other embodiments, when multiple input objects are in the sensing region, the first amount may be different for each input object.

In general it is desirable to select the rate of baseline adjustment and/or the first amount such that effects of hallucinated objects are effectively reduced while the effects of real objects are unlikely to be completed reduced. This may accomplished based on an estimation of how long an expected real object will likely be in the sensing region during typical user inputs, and selecting the first amount (and/or rate) such that it is unlikely that the effects of a real object will be completely reduced (i.e., the baseline value changed to equal the preliminary value corresponding to the real object) before the real object would typically be removed from the sensing region. Because real objects are likely to be removed or moved within the sensing region within a relatively short time period, while hallucinated objects by their nature persist, selecting the first amount in this way facilitates the processing system's ability to completely reduced the effects of hallucinated objects while not greatly interfering with the sensing of real objects.

Naturally, selecting such a first amount would depend greatly upon the sensing cycle rate and the likely difference between preliminary values corresponding to objects and likely baseline values in the system. For example, a system configured to have a relatively large delta between the preliminary values corresponding to real objects and typical baseline values would normally require a larger first amount. Conversely, a system having a higher cycle rate would typically require a smaller first amount, as updating at a higher rate would naturally lead to the effects of a hallucinated object being reduced away at a faster rate.

In one particular embodiment the first amount is selected to be a function of the number of objects in the sensing region. Such a configuration is desirable in embodiments where a larger number of sensed objects in the sensing region correlates to a higher probability that the sensed objects are hallucinated.

In one such embodiment the first amount may be determined by a linear function, such as $A=kN$, where A is the first amount, k is a constant, and N is the number of objects determined to be in the sensing region. In this embodiment the first amount would equal k when one input object is determined to be in the sensing region, 2k when two input objects are determined, and so forth. Such a configuration greatly increases the rate of the baseline increases when more than one input object is determined to be in the sensing region, and thus can greatly increase the speed at which the effects of hallucinated objects are reduced while not significantly degrading the performance of sensing and reacting to real objects. In various embodiments, when no input objects are detected in the sensing region, the amount may be set to a default amount. In other embodiments, the amount is constant.

As another example, in one embodiment, the first amount may be a non-linear relationship corresponding to the number of input objects determined to be in the sensing region. In another embodiment, the first amount may be a linear relationship for a first predetermined number of input objects and non-linear or unchanging for a second predetermined number of input objects. In other embodiments, the first amount may be a function of the size of the input objects in the sensing regions. For example, the first amount may be based on the largest or smallest input object. In other embodiments, a determination module of processing system 110 is configured to dynamically determine the first amount based on any of the above techniques.

As was described above, in some embodiments, in the first mode the processing system selectively increases a baseline value of the plurality of baseline values by a first amount in response to that baseline value being below a corresponding preliminary value. However, in one embodiment the processing system is also configured to selectively decrease a baseline value of the plurality of baseline values by a second amount in response to that baseline value above a corresponding preliminary value. In such an embodiment when the baseline value is above the preliminary value the baseline value is selectively decreased. And again, such selectively decreasing of the baseline values may occur even when an input object is in the sensing region.

Further, as was described above, in some embodiments, in the first mode the processing system selectively decreases a baseline value of the plurality of baseline values by a first amount in response to that baseline value being above a corresponding preliminary value. However, in one embodiment the processing system is also configured to selectively increase a baseline value of the plurality of baseline values by a second amount in response to that baseline value below a corresponding preliminary value. In these embodiments when the baseline value is below the preliminary value the baseline value is selectively increased. And again, such selectively decreasing of the baseline values may occur even when an input object is in the sensing region.

In general, the selective decreasing of the baseline values in response to being above the preliminary values and the selective increasing of the baseline values in response to being below the preliminary values serves to substantially reduce errors in determining positional information for input objects in the sensing regions. In various embodiments, the preliminary values are related to previous preliminary values; however, measured values are based on preliminary values and corresponding baseline values. Therefore, while the preliminary value may change when compared to the previous preliminary value, the measured value may not change by the same amount because the corresponding baseline value is greater than the previous preliminary value. However, if a baseline value is selectively changed by the second amount the measured value determined from the baseline value and preliminary value will be substantially equal to the change between the preliminary value and the previous corresponding preliminary value.

Again, such embodiments may be implemented in a variety of ways. For example, the second amount of selectively changing the baseline values may be selected on various factors, such as those that were described above with reference to changing the baseline based on the first amount. Also, the second amount can be selected as a constant, or dynamically determined in ways similar those described above with reference to the first amount.

In one particular embodiment, the second amount is dynamically determined such that the baseline value is changed to be nearly or at least substantially equal to the preliminary value. In some embodiments when the baseline value is determined to be above the preliminary value it is reduced and made substantially equal to the preliminary value. In other embodiments when the baseline value is determined to be below the preliminary value it is increased and made substantially equal to the preliminary value. Such embodiments have the effect of quickly causing the baseline value to be substantially equal to the corresponding preliminary value, and thus errors in determining positional information for input objects in the sensing region may be reduced.

In some embodiments it may also be desirable to adjust the baseline value when the baseline value is equal to its corresponding preliminary value. However, in most embodiments no adjustment of the baseline value need occur when the baseline value is at least substantially equal to the preliminary value.

Figure 6:
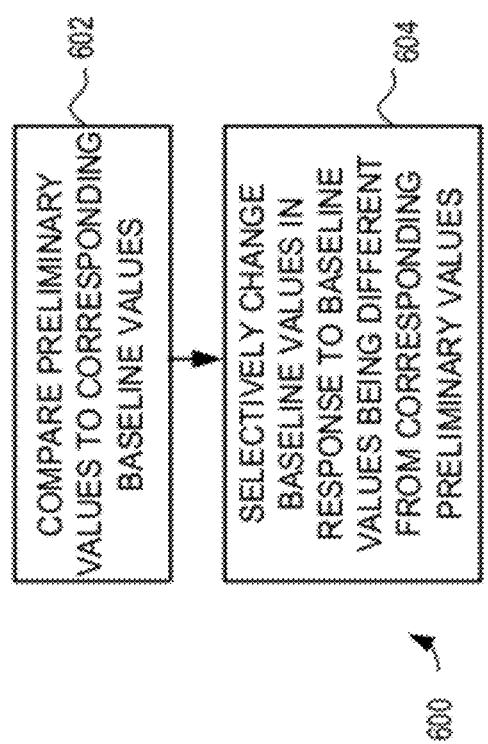
FIG. 6 is a flow diagram of a method for operating in a first mode for determining input in accordance with an embodiment of the invention.

Turning now to FIG. 6, a method 600 for operating in a first mode for determining input is illustrated. The method 600 facilitates the determination of information about input in the sensing region based upon comparisons of preliminary values with corresponding baseline values. In general, the method 600 updates baseline values even when an object is determined to be in the sensing region, and thus facilitates updating of the baseline values in a way that may complete reduce away effects of hallucinated objects.

The first step 602 is to compare preliminary values to corresponding baseline values. As was described above, in a typical implementation each of the preliminary values is compared to corresponding baseline value to determine input to the input device. For example, the difference between each preliminary value and its corresponding baseline value may be determined, and that difference then used as a measured value for determining input in the sensing region. In method 600, the difference between the baseline value and the preliminary value is also used to dynamically adjust the baseline values.

The second step 604 is to selectively change baseline values in response to the baseline value being different from corresponding preliminary values. For example, by changing the baseline value by a first amount in response to the baseline value being different from the corresponding preliminary value.

In one embodiment, selectively changing a baseline value by a first amount comprises selectively increasing the baseline value by the first amount in response to the baseline value being below a corresponding preliminary value. In another embodiment, selectively changing a baseline value by a first amount comprises selectively decreasing the baseline value by the first amount in response to the baseline value being above a corresponding preliminary value.

Figure 7:
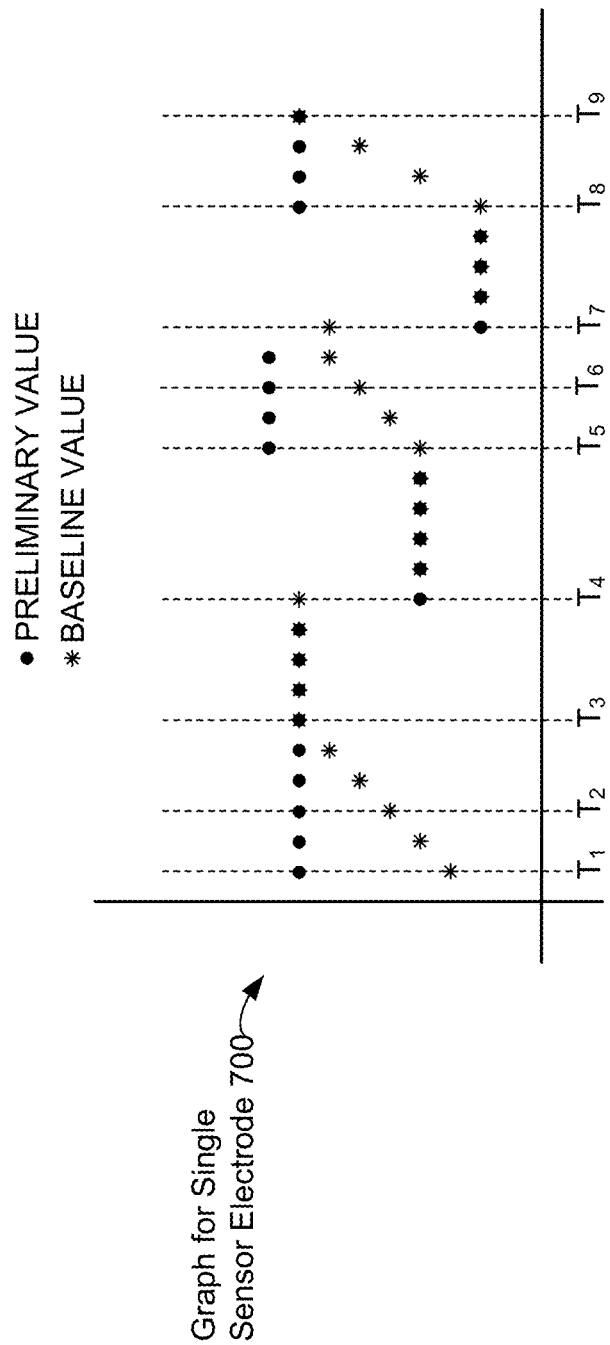
FIG. 7 is a graphical view of preliminary values and baseline values in accordance with an embodiment of the invention.

Turning briefly to FIG. 7, a graph 700 of exemplary preliminary values and baseline values is illustrated. Specifically, the graph 700 shows exemplary changes in the preliminary values and the adjustments made to the corresponding baseline values over time for one node of a capacitive input device. In FIG. 7, the preliminary values are illustrated as filled circles, and the baseline values are illustrated as stars. In one embodiment, FIG. 7 may be representative of a single capacitive pixel, such as between sensor electrodes 220-1 and 210-1. In other embodiments, FIG. 7 may be representative of a single sensor electrode such as sensor electrode 220-1 or 210-1. While in FIG. 7 and the following description the baseline values are changed by a first amount in response to the preliminary value being above a corresponding baseline value and by a second amount in respond to the preliminary values being below a corresponding baseline values, similar description may be applied to embodiments where the baseline values are changed by a first amount in response to the preliminary value being below a corresponding baseline value and by a second amount in response to the preliminary value being above a corresponding baseline value.

In the graph 700, at time $T_1$ the preliminary value is above the corresponding baseline value. In response to this, the corresponding baseline value is increased by a first amount during each cycle that it occurs. This corresponds to performances of step 604 in method 600. As can be seen in graph 700, the baseline value continues to be below the preliminary value and thus is continued to be increased until time $T_3$.

At time $T_2$, an input object may be determined to be in the sensing region. The determination may be based on at least one of the magnitude of the measured value and a time element. In one embodiment, the time element comprises the duration of time for which the magnitude of the measured value meets or exceeds a predetermined value. At time $T_3$ the baseline value then equals the preliminary value, and as such the increasing of the baseline value stops. The baseline value and preliminary value remain equal until time $T_4$. At time $T_4$ the preliminary value drops, and in the next cycle the baseline value is selectively decreased to equal the preliminary value. The baseline value continues equal to the preliminary value until the preliminary value increases at time $T_5$. At this point, the selective increasing of baseline values resumes, again corresponding to performances of step 604. This continues between times $T_5$ and $T_7$, but before the baseline value again equals the preliminary value the preliminary value again drops at time $T_7$. Again, at time $T_6$, an input object may be determined to be in the sensing region.

In the next cycle after $T_7$ the baseline value is again selectively decreased to equal the preliminary value. This continues until the preliminary value increases at time $T_8$, and the baseline values again are again selectively increased. It should be noted that the amount of increase in the baseline values for each cycle is greater between $T_8$ and $T_9$. This illustrates an embodiment where the first amount is not constant. For example, where the first amount is adjusted based upon the number of input objects determined to be in the sensing region. Thus, between $T_8$ and $T_9$ at least two input object were determined to be in the sensing region, and the first amount was thus increased.

As can be seen in FIG. 7, at time $T_3$, after the input object is reported at time $T_2$, the preliminary value equals the baseline value. In one embodiment, at this time the input object may no longer be reported as being in the sensor region, as the measured value would be equal to zero. In one embodiment, in response to the baseline value equaling the preliminary value, processing system 110 may report that the input object determined at time $T_2$, was a hallucinated object. In another embodiment, processing system 110 may report a hallucinated object in response to the measured value being substantially equal to zero for a predetermined number of cycles. In other embodiments, the input object reported at time $T_2$ was substantially stationary in the sensing region from $T_2$ to $T_3$, allowing the baseline values to equal to the preliminary values. In various embodiments, because a hallucinated object appears as a stationary input object in the sensing region, the baseline values will, over time, equal the preliminary value, and unlike in FIG. 7, were at time $T_4$, the baseline value is above the preliminary value, when there is a hallucinated object, the baseline value will not go above the preliminary value. This is because the hallucinated object doesn't leave the sensing region. In various embodiments, even though at time $T_2$, the hallucinated object may be reported as an input object, by increasing the baseline value until it becomes equivalent to the preliminary value at time $T_3$, the possibility that a real input object is determines during a later cycle is improved.

Figure 8:
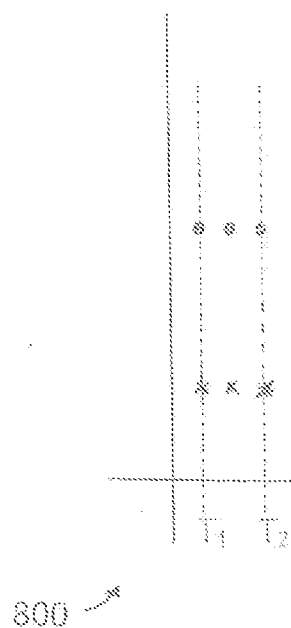
FIG. 8 is a graphical view of preliminary values and baseline values corresponding to the second mode of operation in accordance with an embodiment of the invention.

Again, it should be noted that while FIG. 7 shows the selectively increasing of baseline values in response to that baseline value being less a corresponding value, that this is again just one example. For example, the system could be implemented in any way that reduces corresponding measured values over time. As was described above, in a typical system measured values are determined to reflect the difference between a corresponding preliminary value and a corresponding baseline value. As shown above in FIG. 7, the selective increasing of the baseline values has the effect of reduces the difference between the preliminary value and the corresponding baseline value, and as such would reduce the magnitude of the measured values over time. Such a reduction in the magnitude of the measured values would cause the effects of an input object (either real or hallucinated) to be reduced away over time. Again, in other embodiments the same effect may be accomplished by selectively decreasing measured values directly. This may be done in response to a corresponding baseline value being less in magnitude compared to a corresponding preliminary value. Such an approach effectively reduces effects of input objects directly, without changing the underlying baseline values. FIG. 8 is a graph 800 illustrating the second mode, in which the processing system does not selectively change baseline values by the first amount in response to the baseline values being different from the corresponding preliminary value when the processing system determines that an input object is in the sensing region.

As was described above, in the various embodiments the systems and methods are configured to selectively operate in a first mode and second mode. The systems and methods may be configured to select and switch modes based on a variety of criteria. For example, in some embodiments it is desirable to operate in the first mode upon start up of the device. Typically, when the device first begins operation after some time of inactivity there is a changed likelihood of errors in the calculated baseline values. Thus, there is a changed likelihood of hallucinated objects. For these reasons it is desirable in many cases to begin operation in the first mode to reduce the chance that such hallucinated objects will cause operational problems before known good baseline values can be determined and utilized. However, it should be noted that the first mode could also be utilized at other times. For example, whenever there is a possibility of input objects affecting the baseline value determination.

Likewise, the system may be configured to switch to operating in the second mode for a variety of reasons. For example, the processing system may be configured to switch from operating in the first mode to the second mode in response to a determined period of time. Such a time period may be predetermined, based on empirical user data, based on different usage models or based on system resources.

As another example, the processing system may be configured to switch from operating in the first mode to the second mode in response to a determination that no input objects are in the sensing region. In this embodiment when it is determined that no input objects are in the sensing region known good baseline values may be determined and thus the probability of persistent hallucinated objects is greatly reduced. Thus, the input device may be switched to the second mode with a strong likelihood that the baseline values were determined when no input objects are determined were in the sensing region.

As another example, the processing system may be configured to switch from operating in the first mode to the second mode in response to a signal provided by a controller. In some embodiment, the signal may be referred to as an external control signal. For example, in response to a signal generated by the host device such as an associated electronic system. Similarly, in response to a signal generated by a controller in the input device. In these embodiments, the signal may indicate to the processing system when there is a substantially high probability that no input objects are in the sensing region. In one embodiment, the signal may be provided after a user is interacts with the host device for a period of time, allowing the host device to determine that there is an actual user interacting with the host device, not a hallucinated object. In other embodiments, the signal may be provided after a user completes a number of interactions with the host device, such as button entries, and control gestures. The location and types of interactions may be varied, to increase the probability that a user is interacting with the host device, not a hallucinated object In yet further embodiments; a determination module of processing system 110 is configured to switch from operating in the first mode to operating the second mode based on any of the above techniques.

The embodiments of the present invention thus provide devices and methods that facilitate improved sensor devices. Specifically, the devices and methods provide the ability to determine both user input and interference for input devices. The reliable determination of interference in input device facilitates ameliorative action, and thus facilitates improved input device performance.

The embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for use with a capacitive input device of the type having a plurality of capacitive sensor electrodes and configured to sense in a sensing region, the processing system comprising:

sensor electrode circuitry configured to operate the plurality of capacitive sensor electrodes to produce pluralities of preliminary values, each preliminary value corresponding to an individual measured capacitance associated with a corresponding capacitive pixel and obtained using a sensor electrode of the plurality of sensor electrodes, the pluralities of preliminary values comprising a first plurality of preliminary values and a second plurality of preliminary values, the second plurality of preliminary values obtained after the first plurality of preliminary values; and a determination module configured to determine information about input in the sensing region based on comparisons of the pluralities of preliminary values with corresponding baseline values of a plurality of baseline values, wherein the determination module is configured to selectively operate in a first mode and a second mode such that:

while operating in the first mode, the determination module individually compares a baseline value of the plurality of baseline values with a corresponding preliminary value of the first plurality of preliminary values, and selectively changes the baseline value by a first amount when the baseline value is different from the corresponding preliminary value to obtain an updated baseline, wherein, in the first mode, the selectively changing the baseline value is performed even when the processing system determines that an input object is in the sensing region; and while operating in the second mode, the determination module does not selectively change the baseline value by the first amount when the baseline value and the corresponding preliminary value are different and when the processing system determines that the input object is in the sensing region, wherein the determination module is configured to switch from operating in the first mode to operating in the second mode in response to one of an external signal and a determination that no input objects are in the sensing region, wherein the determination module is further configured to:

determine a difference between a corresponding baseline value in the updated baseline and a corresponding preliminary value in the second plurality of preliminary values to obtain a plurality of measured values, detect, from the plurality of measured values, the input object in the sensing region, and provide, to an electronic system, positional information of the input object based on detecting the input object.

2. The processing system of claim 1, wherein while operating in the first mode, the determination module selectively changes the baseline value of the plurality of baseline values by the first amount in response to the baseline value being different from the corresponding preliminary value of the pluralities of preliminary values even when the processing system determines that the input object is in the sensing region by:

selectively increasing the baseline value of the plurality of baseline values by the first amount in response to the baseline value being below the corresponding preliminary value of the pluralities of preliminary values.

3. The processing system of claim 2, wherein while operating in the first mode the determination module is further configured to:

selectively decrease the baseline value in response to the baseline value being above the corresponding preliminary value of the pluralities of preliminary values.

4. The processing system of claim 1, wherein while operating in the first mode, the determination module selectively changes the baseline value of the plurality of baseline values by the first amount in response to the baseline value being different from the corresponding preliminary value of the pluralities of preliminary values even when the processing system determines that the input object is in the sensing region by:

selectively decreasing the baseline value of the plurality of baseline values by the first amount in response to the baseline value being above the corresponding preliminary value of the pluralities of preliminary values.

5. The processing system of claim 4, wherein while operating in the first mode the determination module is further configured to:

selectively increase the baseline value in response to the baseline value being below the corresponding preliminary value of the pluralities of preliminary values.

6. The processing system of claim 1, wherein the first amount is constant.

7. The processing system of claim 1, wherein while operating in the second mode the determination module is configured to change each baseline value in response to drift over time caused environmental changes.

8. The processing system of claim 1, wherein the determination module is configured to determine the first amount dynamically based on a determined number of input objects in the sensing region.

9. The processing system of claim 1, wherein the determination module is further configured to switch from operating in the first mode to operating in the second mode in response to a determined period of time, wherein the determined period of time is based on one of: a predetermined period of time; empirical user data; a usage model; and system resources.

10. An input device comprising:

a plurality of capacitive sensor electrodes; and a processing system coupled to the plurality of capacitive sensor electrodes, the processing system configured to:

operate the plurality of capacitive sensor electrodes to sense in a sensing region and produce pluralities of preliminary values, each preliminary value corresponding to an individual measured capacitance associated with a corresponding capacitive pixel and obtained using a capacitive sensor electrode of the plurality of capacitive sensor electrodes, the pluralities of preliminary values comprising a first plurality of preliminary values and a second plurality of preliminary values, the second plurality of preliminary values obtained after the first plurality of preliminary values;

determine information about input in the sensing region based on comparisons of the pluralities of preliminary values with corresponding baseline values of a plurality of baseline values;

selectively operate in a first mode and a second mode, wherein:

while operating in the first mode, the processing system individually compares a baseline value of the plurality of baseline values with a corresponding preliminary value of the first plurality of preliminary values, and selectively changes the baseline value by a first amount when the baseline value is substantially different from the corresponding preliminary value to obtain an updated baseline, wherein, in the first mode, the selectively changing the baseline value is performed even when the processing system determines that an input object is in the sensing region; and while operating in the second mode, the processing system does not selectively change the baseline value by the first amount when the baseline value is different from the corresponding preliminary value and when the processing system determines that the input object is in the sensing region; and determine a difference between a corresponding baseline value in the updated baseline and a corresponding preliminary value in the second plurality of preliminary values to obtain a plurality of measured values;

detect, from the plurality of measured values, the input object in the sensing region; and provide, to an electronic system, positional information of the input object based on detecting the input object, wherein the processing system is configured to switch from operating in the first mode to operating in the second mode in response to at least one of a determination that no input objects are in the sensing region and external control signal from a controller.

11. The input device of claim 10, wherein while operating in the first mode, the processing system selectively changes the baseline value of the plurality of baseline values by the first amount in response to the baseline value being different from the corresponding preliminary value of the pluralities of preliminary values even when the processing system determines that the input object is in the sensing region by:

selectively increasing the baseline value of the plurality of baseline values by the first amount in response to the baseline value being below the corresponding preliminary value of the pluralities of preliminary values.

12. The input device of claim 10, wherein while operating in the first mode, the processing system selectively changes the baseline value of the plurality of baseline values by the first amount in response to the baseline value being different from the corresponding preliminary value of the pluralities of preliminary values even when the processing system determines that the input object is in the sensing region by:

electively decreasing the baseline value of the plurality of baseline values by the first amount in response to the baseline value being above the corresponding preliminary value of the pluralities of preliminary values.

13. The input device of claim 10, wherein the processing system is configured to determine the first amount dynamically based on a determined number of input objects in the sensing region of the input device.

14. The input device of claim 10, wherein the determination module is further configured to switch from operating in the first mode to operating in the second mode in response to a determined period of time, wherein the determined period of time is based on one of: a predetermined period of time; empirical user data; a usage model; and system resources.

15. A method for determining input to and implemented by a capacitive input device of the type having a plurality of capacitive sensor electrodes and configured to sense in a sensing region, the method comprising:

determining information about input in the sensing region based on comparisons of pluralities of preliminary values with corresponding baseline values of a plurality of baseline values, each preliminary value corresponding to an individual measured capacitance associated with a corresponding capacitive pixel and obtained using a capacitive sensor electrode of the plurality of capacitive sensor electrodes, the pluralities of preliminary values comprising a first plurality of preliminary values and a second plurality of preliminary values, the second plurality of preliminary values obtained after the first plurality of preliminary values; and selectively operating the capacitive input device in a first mode and a second mode, wherein:

while operating in the first mode, individually comparing a baseline value of the plurality of baseline values with a corresponding preliminary value of the first plurality of preliminary values, and selectively changing the baseline value by a first amount when the baseline value is different from the corresponding preliminary value, wherein, in the first mode, the selectively changing the baseline value is performed even when an input object is determined to be in the sensing region;

while operating in the second mode, not selectively changing the baseline value by the first amount when the baseline value is different from the corresponding preliminary value and when an input object is determined to be in the sensing region; and determining a difference between a corresponding baseline value in the updated baseline and a corresponding preliminary value in the second plurality of preliminary values to obtain a plurality of measured values, detecting, from the plurality of measured values, the input object in the sensing region, and providing, to an electronic system, positional information of the input object based on detecting the input object, wherein the capacitive input device is configured to switch from operating in the first mode to operating in the second mode in response to one of an external signal and a determination that no input objects are in the sensing region.

16. The method of claim 15, wherein while operating in the first mode selectively changing the baseline value of the plurality of baseline values by the first amount in response to the baseline value being different from the corresponding preliminary value of the pluralities of preliminary values even when the input object is in the sensing region by:

selectively increasing the baseline value of the plurality of baseline values by the first amount in response to the baseline value being below the corresponding preliminary value of the pluralities of preliminary values.

17. The method of claim 15, wherein while operating in the first mode selectively changing the baseline value of the plurality of baseline values by the first amount in response to the baseline value being different from the corresponding preliminary value of the pluralities of preliminary values even when the input object is in the sensing region by:

selectively decreasing the baseline value of the plurality of baseline values by the first amount in response to the baseline value being above the corresponding preliminary value of the pluralities of preliminary values.

18. The method of claim 15, further comprising dynamically determining the first amount based on a determined number of input objects in the sensing region.

19. The method of claim 15, further comprising switching from operating in the first mode to operating in the second mode.

20. The method of claim 15, wherein the determination module is further configured to switch from operating in the first mode to operating in the second mode in response to a determined period of time, wherein the determined period of time is based on one of: a predetermined period of time; empirical user data; a usage model; and system resources.

* * * * *